US009043589B2

(12) United States Patent
Vail et al.

(10) Patent No.: US 9,043,589 B2
(45) Date of Patent: May 26, 2015

(54) SYSTEM AND METHOD FOR SAFEGUARDING AND PROCESSING CONFIDENTIAL INFORMATION

(75) Inventors: Robert R. Vail, North Tonawanda, NY (US); Mary Jo Billings, Frisco, TX (US); Robert D. Bohrer, Troy, OH (US); Robert D. Brooks, II, St. Charles, MO (US); Mary M. Emmighausen, Avon, NY (US); Howard M. Fannin, Celina, TX (US); Edward R. Jaroch, Dillsburg, PA (US); Tonya L. Justice, Amherst, OH (US); Alan L. Kelkenberg, Lockport, NY (US); Scott R. Morris, Tonawanda, NY (US); William T. Parks, Jr., Dallas, TX (US); Hayes I. Saxon, Cedar Park, TX (US); William L. Weaver, Plano, TX (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 1204 days.

(21) Appl. No.: 11/940,018

(22) Filed: Nov. 14, 2007

(65) Prior Publication Data

US 2009/0126002 A1    May 14, 2009

(51) Int. Cl.
*H04L 29/06* (2006.01)
*G06F 21/56* (2013.01)

(52) U.S. Cl.
CPC ........ *H04L 63/0209* (2013.01); *H04L 63/1416* (2013.01); *G06F 21/564* (2013.01); *H04L 63/18* (2013.01); *H04L 63/08* (2013.01)

(58) Field of Classification Search
CPC ...................................................... H04L 63/18

USPC .......................................................... 713/153
See application file for complete search history.

(56) References Cited

U.S. PATENT DOCUMENTS

| 5,781,632 | A  | * | 7/1998  | Odom ............................. 705/78 |
| 6,092,202 | A  | * | 7/2000  | Veil et al. ......................... 726/27 |
| 6,442,607 | B1 | * | 8/2002  | Korn et al. ..................... 709/225 |
| 6,681,327 | B1 | * | 1/2004  | Jardin ............................ 713/153 |
| 7,024,548 | B1 | * | 4/2006  | O'Toole, Jr. ..................... 713/1 |
| 7,350,229 | B1 | * | 3/2008  | Lander ............................. 726/8 |
| 2001/0034725 | A1 | * | 10/2001 | Park et al. ........................ 705/79 |
| 2005/0203921 | A1 | * | 9/2005  | Newman et al. .............. 707/100 |
| 2006/0101520 | A1 | * | 5/2006  | Schumaker et al. ............ 726/25 |
| 2007/0153689 | A1 | * | 7/2007  | Strub et al. ..................... 370/230 |
| 2007/0170245 | A1 | * | 7/2007  | Elbaum et al. ................ 235/380 |
| 2008/0022382 | A1 | * | 1/2008  | Bradbury ........................ 726/10 |
| 2008/0034424 | A1 | * | 2/2008  | Overcash et al. ............... 726/22 |
| 2008/0034425 | A1 | * | 2/2008  | Overcash et al. ............... 726/22 |
| 2008/0216176 | A1 | * | 9/2008  | Lomont et al. .................. 726/24 |
| 2009/0150995 | A1 | * | 6/2009  | Hogan et al. ................... 726/21 |

* cited by examiner

*Primary Examiner* — Longbit Chai
(74) *Attorney, Agent, or Firm* — Baker Botts LLP

(57) ABSTRACT

One aspect of the invention is a method for providing restricted access to confidential services without impacting the security of a network. The method includes using a gateway to isolate one or more components providing confidential services from one or more other portions of an enterprise network. A first communication directed to a selected one of the one or more components may be received at the gateway. A determination may be made as to whether the first communication is user traffic or management traffic. The first communication may then be authenticated. If the first communication is user traffic, the first communication is forwarded to a component providing the confidential services. If the first communication is management traffic, the first communication is encrypted and forwarded to a component providing the confidential services. Additionally, components of the subnetwork may be monitored to identify malicious changes.

44 Claims, 3 Drawing Sheets

SYSTEM AND METHOD FOR SAFEGUARDING AND PROCESSING CONFIDENTIAL INFORMATION

TECHNICAL FIELD OF THE INVENTION

This invention relates generally to network communications systems and more particularly to a system and method for safeguarding and processing confidential information.

BACKGROUND OF THE INVENTION

Currently, there exist no standard, regulatory requirements or federal guidelines governing the processing and storage of confidential financial information by the Payment Card Industry (PCI). As a result, several of the larger credit card companies, such as Visa and MasterCard, have privately devised a set of security control standards to be used by PCI entities. Although not a promulgated set of standards or regulations, entities not meeting the PCI control standards can be fined or even denied the right to process credit card information. As a result, virtually every company processing credit card information must meet the PCI control standards. Such standards are extremely restrictive and costly to implement. Where credit card processing or functionality is a core component of the business, an entire corporate network can be made PCI compliant. Such architectures, however, lack flexibility. Additionally, such architectures do not easily accommodate larger entities that provide a variety of service offerings other than the processing of credit card information. In many instances, making an entire corporate network PCI compliant may be cost prohibitive or may result in increased costs to clients.

SUMMARY OF THE INVENTION

One aspect of the invention is a method for providing restricted access to confidential services without impacting the security of a network. The method includes using a gateway to isolate one or more components providing confidential services from one or more other portions of an enterprise network. A first communication directed to a selected one of the one or more components may be received at the gateway. A determination may be made as to whether the first communication is user traffic or management traffic. The first communication may then be authenticated. If the first communication is user traffic, the first communication is forwarded to a component providing the confidential services. If the first communication is management traffic, the first communication is encrypted and forwarded to a component providing the confidential services. Additionally, components of the sub-network may be monitored to identify malicious changes.

The invention has several important technical advantages. Various embodiments of the invention may have none, one, some, or all of these advantages without departing from the scope of the invention. In particular embodiments, a system architecture and method are provided that includes separating PCI compliant devices from other network devices. Additionally, two distinct network paths may be used to separate management and administration traffic from production and user traffic. In particular embodiments, management and administration traffic may be subject to more rigorous security measures. Because only management traffic to PCI-compliant devices and not user traffic may undergo these rigorous security measures, the user experience may remain unchanged even when the user utilizes a PCI application. Accordingly, the described system architecture and method minimizes the impact to the user. Only the traffic which accesses PCI-compliant servers to store, process, manipulate, or review cardholder data as part of an application, are considered management and/or administration traffic and, thus, are directed to the network path for management/administration traffic.

BRIEF DESCRIPTION OF THE DRAWINGS

For a more complete understanding of the present invention and the advantages thereof, reference is now made to the following descriptions taken in conjunction with the accompanying drawings in which.

DETAILED DESCRIPTION OF THE INVENTION

The preferred embodiment of the present invention and its advantages are best understood by referring to FIGS. 1-4 of the drawings, like numerals being used for like and corresponding parts of the various drawings.

Although there are currently no standardized or federally regulated standards governing the processing and storage of confidential credit information, organizations like VISA® and MASTERCARD® have devised such a set of standards. The Payment Card Industry (PCI) control standards set forth six basic requirements. First, the PCI compliant entity must build and maintain a secure network. A firewall configuration must be installed and maintained to protect PCI data. Passwords used by the security system can not include vendor-supplied default passwords. Second, the PCI compliant entity must protect cardholder data. Stored data must be protected, and PCI data transmissions across public networks must be encrypted. Third, a vulnerability management program must be maintained. The vulnerability management program includes the use of regularly updated anti-virus software. Fourth, strong access control measures must be implemented. This requires restricted access to PCI data on a need-to-know basis. Unique identifiers must be assigned to each person with computer access, and physical access to cardholder data must be restricted. Fifth, PCI compliant networks must be regularly monitored and tested. Access requests to network resources and cardholder data must be tracked and monitored. Security systems and processes must be regularly tested. Finally, an information security policy must be maintained.

The systems and methods of FIGS. 1-4 are devised for the systematic implementation of Payment Card Industry (PCI) security control standards within a demilitarized zone (DMZ) of a private entity network. The DMZ contains the PCI infrastructure and services required to obtain PCI compliance. Because the private network includes a DMZ of PCI compliant hardware and software, it is not necessary to make the entire private network PCI compliant. Thus, the DMZ comprises an isolated PCI-compliant network within the larger and mostly, non-compliant private network.

Figure 1:
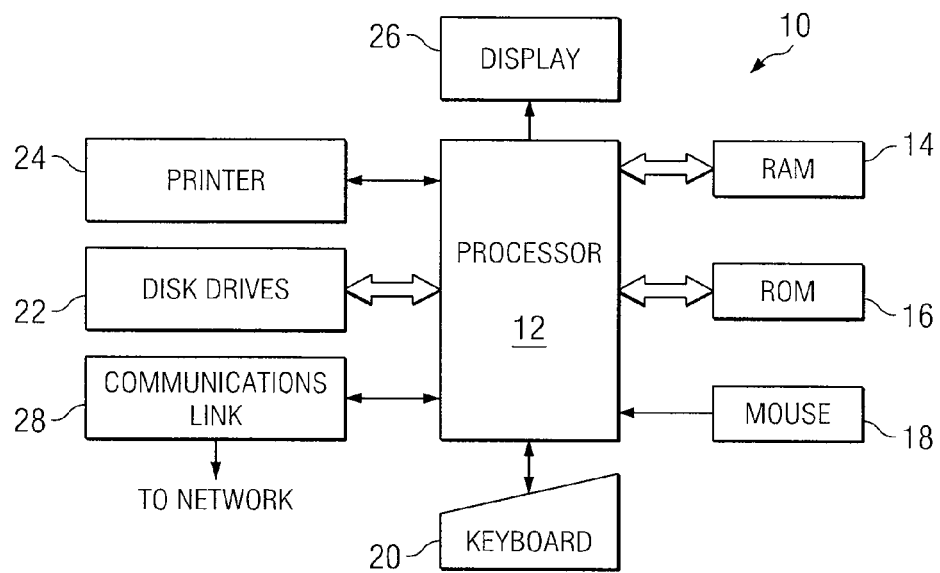
FIG. 1 illustrates a block diagram of a general purpose computer that may be used in accordance with the present invention.

FIG. 1 illustrates a general purpose computer 10 that may be used for safeguarding and processing confidential information in accordance with the present invention. In certain embodiments, general purpose computer 10 may comprise a portion of a private network and may be used to execute applications and software to access various components of the private network. In certain embodiments, general purpose computer 10 may comprise a computer that is at least partially isolated from the private network and operates to provide various PCI services. In particular embodiments, general purpose computer 10 may operate to store PCI data such as credit card information and/or process PCI data requests such as credit card transactions.

General purpose computer 10 may be adapted to execute any of the well known MS-DOS, PC-DOS, OS2, UNIX, MAC-OS and Windows operating systems or other operating systems. As used in this document, operating system may refer to the local operating system for computer 10, a network operating system, or a combination of both. General purpose computer 10 comprises processor 12, random access memory (RAM) 14, read only memory (ROM) 16, mouse 18, keyboard 20, and input/output devices such as printer 24, disk drives 22, display 26 and communications link 28. The present invention includes programs that may be stored in RAM 14, ROM 16, or disk drives 22 and may be executed by processor 12. Communications link 28 is connected to a computer network but could be connected to a telephone line, an antenna, a gateway, or any other type of communication link. Disk drive 22 may include a variety of types of storage media such as, for example, floppy disk drives, hard disk drives, CD ROM drives, or magnetic tape drives. Disk drive 22 may also include a network disk housed in a server within the private network. Although this embodiment employs a plurality of disk drives 22, a single disk drive 22 could be used without departing from the scope of the invention.

As illustrated, FIG. 1 only provides one example of a computer that may be used with the invention. The invention could be used with computers other than general purpose computers as well as general purpose computers without conventional operating systems.

Figure 2:
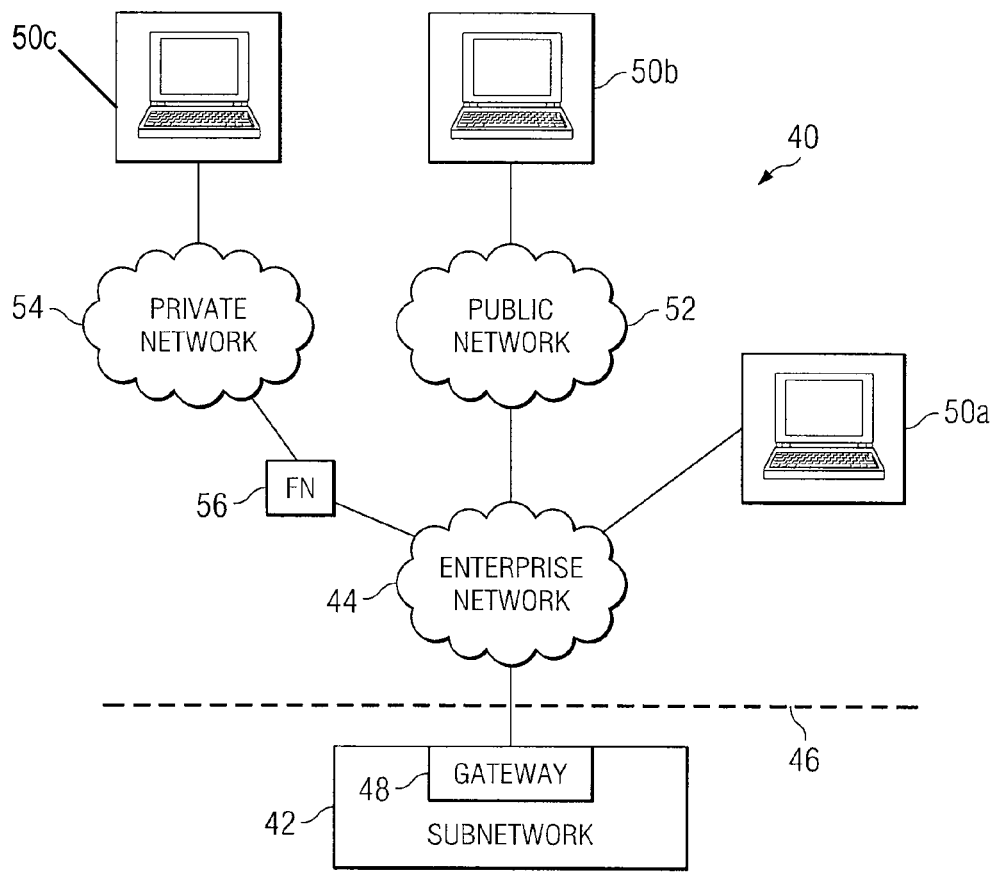
FIG. 2 illustrates a block diagram of an example system that may be used for safeguarding and processing confidential information in accordance with the present invention.

FIG. 2 illustrates a block diagram of an example system 40 that may be used for managing, processing, and storing confidential information by an enterprise in accordance with the present invention. Specifically, a sub-network 42 is established within a enterprise network 44 of system 40. The sub-network 42 is within a demilitarized zone (DMZ) 46 under the control of enterprise network 44. Sub-network 42 is used to isolate confidential information and the system components processing such confidential information from components of private network 44 that are outside of DMZ 46. In particular embodiments, the confidential information stored and processed by sub-network 42 comprises PCI data relating to credit information, privacy information, financial information, or other confidential information. As such, sub-network 42 comprises an infrastructure of servers and other PCI compliant components. Such components are described in more detail with respect to FIG. 3 and may include authentication modules, firewalls, network intrusion detection sensors (NIDS), integrity management modules, logging modules, proxy services modules, and encryption modules. Traffic traveling solely within sub-network 42 may or may not be encrypted. Traffic originating or being transmitted outside DMZ 46 must be encrypted.

Sub-network 42 includes a gateway 48, which operates as a security control point. Gateway 48 may include a node on sub-network network 42 that serves as an access point to sub-network network 42. Gateway 48 may also act as a proxy server and a firewall. In certain embodiments, gateway 48 acts as a firewall between enterprise network 44 and sub-network 42. Thus, gateway 48 may allow clients 50 selective access to sub-network 42. Accordingly, gateway 48 may include the hardware and/or software for preventing unauthorized access to or from sub-network 42. In particular embodiments, gateway 48 may be configured substantially like computer 10 described above with regard to FIG. 1. Alternatively, gateway 48 may include any general purpose computer with the appropriate applications and functionality for managing communications traversing sub-network 42.

In particular embodiments, gateway 48 may operate to route communications and other traffic to, from, and within sub-network 42. For example, gateway 48 performs checks on traffic received at gateway 48 and allows only appropriate traffic to enter sub-network 42. As will be described in more detail below, gateway 48 enables untrusted networks, entities, or resources to access services or data provided by sub-network 42 without impacting the security of sub-network 42.

Components that may access services or data provided by sub-network 42 may include clients 50 communicating via enterprise network 44, a public network 52, a private network 54 or some combination thereof. Clients 50 may include any devices that provide network services, provide access to network services, or provide a combination of these or other functionalities. For example, in particular embodiments, a client 50 may comprise a computer. In other embodiments, a client 50 may comprise a wireless router, port, or other communication device that may be used to establish communication with network computers and/or visiting computers to provide access to enterprise network 44 and sub-network 42.

In the illustrated embodiment, system 10 includes at least one client 50a that accesses services or data provided by sub-network 42 solely by way of enterprise network 44 and the enterprise infrastructure. Clients such as client 50a may include those computers and other devices that are at a location associated with the enterprise such that security of client 50a is controlled solely by enterprise network 44.

Other clients such as client 50b may access enterprise network 44 via a public network 52 and/or a private network 54 that is not associated with the enterprise. As will be explained below with regard to FIG. 3, extra security measures may be taken before such clients 50b and 50c are allowed access to sub-network 42. For example, clients 50b and/or 50c may be required to authenticate to the network using two-factor authentication. Two factor-authentication requires that the user provide two pieces of information. The information may include a combination of user names, passwords, pass phrases, cryptographic keys, or tokens. Additionally or alternatively, traffic generated from clients 50b and 50c may be required to pass through a firewall 56, which is configured to permit, deny, or proxy data based on a specified level of trust.

Although the system 40 has been described in detail, it should be understood that various changes, substitutions and alterations can be made to system 40 without departing from the sphere and scope of the invention. For example, system 10 may have more or less components (of these or differing types) without departing from the scope of the invention.

Figure 3:
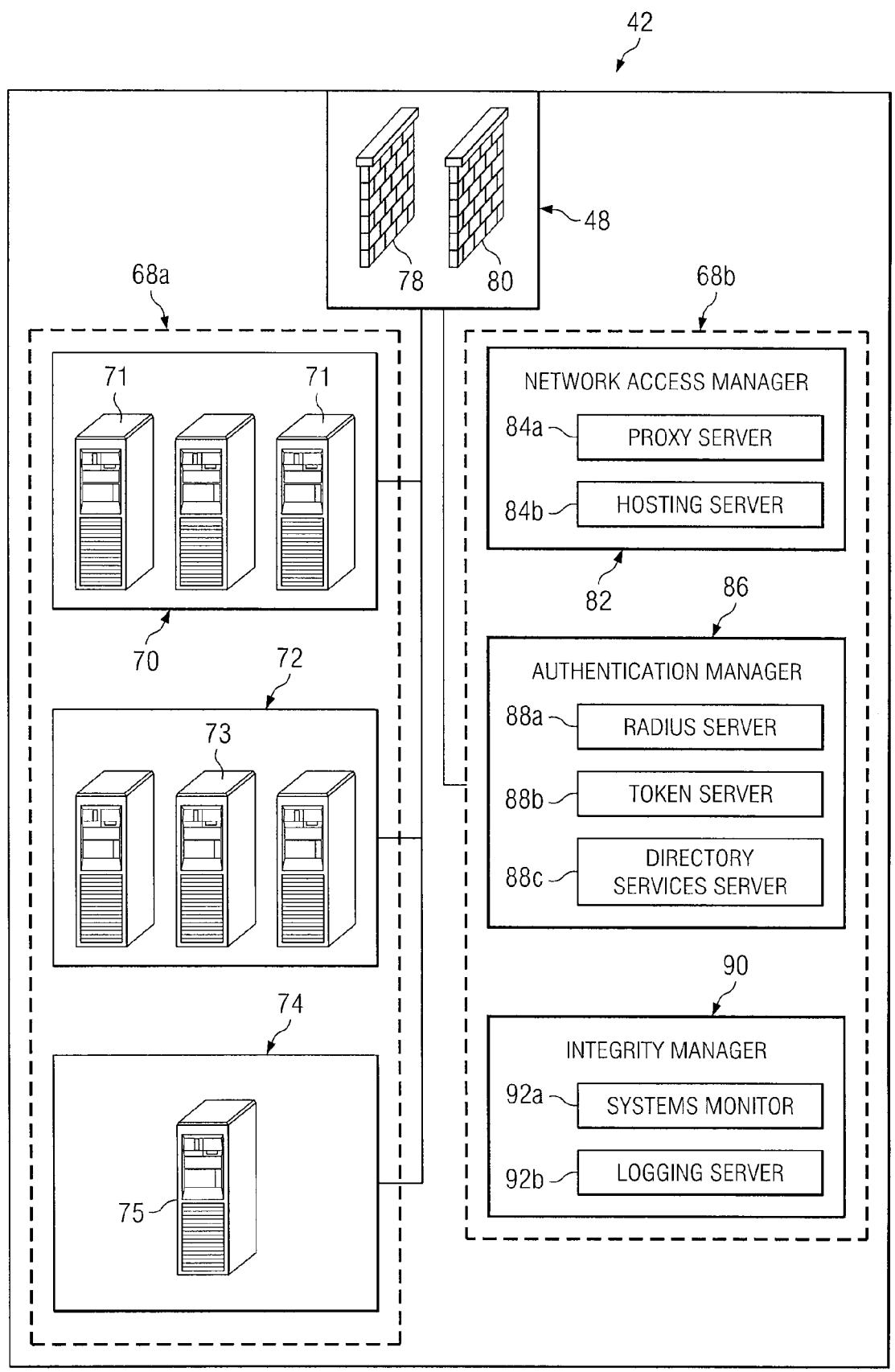
FIG. 3 illustrates a block diagram of an example sub-network for segregating an infrastructure of servers and other components safeguarding and processing confidential information from non-compliant components of an enterprise network.

As discussed above, system 10 logically isolates devices that either process, store, review, or manipulate confidential data such as PCI data from the private network 54. Specifically, devices that store and/or process PCI data must be placed in a secure network area to meet PCI compliance standards. Such a sub-network 42 houses leveraged servers, mainframes, and other devices that process, review, manipulate, or store PCI data with the DMZ. FIG. 3 illustrates an example sub-network configured for managing, processing, and storing confidential data, in accordance with a particular embodiment. In the illustrated embodiment, sub-network 42 includes a gateway 48 and two trusted zones 68. A first trusted zone 68a houses devices that are used for data processing. A second trusted zone 68b contains devices that are used to securely access and manage the devices in the first trusted zone 68a. It is recognized, however, that sub-network 42 may have more or less components (of these or differing types) without departing from the scope of the invention. Similarly, each of trusted zones 68a and 68b may have more or less components (of these or differing types) without departing from the scope of the invention. As such, it is further recognized that the functionalities described below for each of the illustrated components of sub-network 42 may be combined or separated for the particular components included in sub-network 42.

Gateway 48 operates as described above with regard to FIG. 2. Specifically, gateway 48 operates to receive and route communications and other traffic to, from, and within sub-network 42. More specifically, gateway 48 operates to separate traffic received from sources external to sub-network 42 and direct the traffic to the appropriate trusted zone 68a and 68b. As such, gateway 48 may include at least one dedicated firewall 78 through which all traffic to or from devices within sub-network 42 traverses.

In particular embodiments, gateway 48 may include two firewalls. A first firewall 78 may receive all traffic entering or exiting sub-network 42. Thus, first firewall 78 receives user and production traffic as well as management traffic that is related to the administration of PCI devices. In operation, first firewall 78 may separate traffic into two streams. A first stream includes user and production traffic that seeks access to devices within first trusted zone 68a. User and production traffic may include interactive user or consumer traffic from clients 50 that is not within or associated with private network 44. Production and user traffic may include data that contains confidential information such as credit card information or customer financial/privacy information. Upon authorization by first firewall 78, user and production traffic may be directed to the requested sub-network device within first trusted zone 68a.

Trusted zone 68a houses leveraged servers, mainframes, and other devices that process, review, manipulate, or store PCI data with the DMZ. In the illustrated embodiment, trusted zone 68a includes a first server module 70. First server module 70 includes one or more service offering servers 71. Service offering servers 71 are compliant servers that operate to store and/or process PCI data. For example, service offering servers 71 may store or process data that contains credit card information, in particular embodiments. As another example, service offering servers 71 may store or process customer financial or other privacy related information.

In particular embodiments, trusted zone 68a may also include a second server module 72. Second server module 72 may include one or more client-specific service offering servers 73. Service offering servers 73 are specific to a single client such that the service offering servers 73 operate to store and/or process PCI data for a single client. For example, service offering servers 73 may store or process data that contains credit card information for a particular store front or corporation. As another example, service offering servers 73 may store or process customer financial or other privacy related information for a particular store front or corporation.

In the illustrated embodiment, trusted zone 68a also includes a third server module 74. Third server module 74 may include a mainframe server 75 and is also PCI compliant. In particular embodiments, mainframe server 75 includes one or more computing systems compatible with the IBM System/360 line, first introduced in 1965. Additionally, mainframe server 75 may include a Logical Partition, commonly called an LPAR, is a virtualized computing environment abstracted from all physical devices.

As discussed above, user and production traffic is directed to first trusted zone 68a. In contrast to user and production traffic, traffic that is deemed by first firewall 78 as being management traffic may be routed from first firewall 78 to a second firewall 80. In particular embodiments, second firewall 80 may include a secure application gateway (SAG). Management traffic may include traffic from users within the entity controlling private network 42. Management traffic may include data that is utilized to support, manage, administrate, or deliver services to devices, applications, databases, or services which contain confidential information or support a sub-network 42 device.

Where PCI data is processed by sub-network 42, management of the infrastructure components and information technology operation activities within sub-network 42 are PCI compliant. Thus, management traffic must be PCI compliant. In order to be PCI compliant, certain security controls and mechanisms may be implemented.

Security Controls

Second trusted zone 68b includes at least one security module operable to implement PCI security controls. For example, second trusted zone 68b includes an network access module 82. In particular embodiments, network access module 82 controls how administrative users of clients 50 access and manage equipment and software within first trusted zone 68a. Network access module 82 is installed to enforce access control rules for traffic between clients 50 of private network 44 and clients 50 of other networks such as private network 54 and public network 52.

Additionally, network access module 82 operates to encrypt traffic passing through into and out of sub-network 42. For example, any traffic generated within sub-network 42 and directed out of sub-network 42 may be encrypted by network access module 82. Similarly, any traffic generated outside sub-network 42 and directed into sub-network 42 is encrypted by network access module 82. By contrast, traffic that does not cross from one side of the DMZ 46 to the other is not encrypted. Thus, traffic generated within sub-network 42 and directed to other components within sub-network 42 is not necessarily encrypted. However, to remain PCI compliant, it is recognized that unencrypted traffic must be contained within sub-network 42.

In particular embodiments, certain traffic may not be supported by encryption module 82. For example, where encryption module 82 comprises a Permeo proxy server, any applications running outside of a SOCKS connection and the secure sockets layer protocol may not be supported by encryption module 82. Thus, in particular embodiments, network access module 82 may include a hosting server 84b for hosting unsupported applications or tools. In particular embodiments, hosting server 84b includes a "Tarantella" server that includes Sun Secure Global Desktop (SGD) software. Tarantella SGD uses secure sockets layer protocol with a self-signed certificate.

In particular embodiments, certain traffic may not be supported by encryption module 82. For example, where encryption module 82 comprises a Permeo proxy server, any applications running outside of a SOCKS connection and the secure sockets layer protocol may not be supported by encryption module 82. Thus, in particular embodiments, network access module 82 may include a hosting server 84b for hosting unsupported applications or tools. In particular embodiments, hosting server 84 includes a "Tarantella" server that includes Sun Secure Global Desktop (SGD) software. Tarantella SGD uses secure sockets layer protocol with a self-signed certificate.

As described above, the various components of network access module 82 control how administrative users of clients 50 access and manage equipment and software within first trusted zone 68a. Although network access module 82 is illustrated as having two components including a proxy server 84a and a hosting server 84b, network access module 82 may include more or fewer components. For example, in particular embodiments, the functions of proxy server 84a and hosting server 84b may be performed by a single component or by more than two components.

Authentication Controls

Authentication is the process of attempting to verify this digital identity of the sender of a communication such as a request to log in. Thus, senders of traffic to sub-network 42 are authenticated prior to such traffic being allowed into sub-network 42. Senders being authenticated may be a person of a client 50, client 50, or a computer program of client 50 or other computing system.

To perform authentication operations, second trusted zone 68b includes an authentication module 86. Authentication module 86 receives and processes identification information received from a subject trying to use, process, or access devices in trusted zones 68a and 68b. The subject may include, client 50, a program running on client 50, or a user of client 50. The identification information used to authenticate the subject uniquely identifies who or what the subject claims to be. In various embodiments, the identification information used by authentication module 86 to authenticate a subject may include user names, identification numbers, addresses, account numbers, digital signatures, anatomical attribute, or other uniquely identifying information.

In particular embodiments, authentication module 86 may include a Remote Authentication Dial-In User Service (RADIUS) server 88a that enables remote user authentication. RADIUS server 88a provides centralized authentication and/or accounting service for system 40. As a result, clients 50, such as clients 50b and 50c that are not in direct communication with private network 44 may be authenticated. For example, a user at client 50b, who is accessing private network 44 by way of a public network 52 may be required to provide identification information such as that discussed above for authentication by RADIUS server 88a. RADIUS server 88a may compare the identification information with information maintained by RADIUS server 88a or another component of authentication module 86 to determine the identity of the user and whether the user is authorized to access sub-network 42.

In certain embodiments, two factor authentication may be deployed by authentication module 86. Two factor authentication requires that the subject of the authentication process provide a second piece of information to the credential set. The second piece of information may be a password, pas phrase, cryptographic key, or token. For example, a user of client 50c that accesses private network 44 by way of a second unaffiliated private network 54, may be required to provide the second piece of information. These two credential items are compared to the information previously stored for the subject. If the credentials match the stored information, the subject is authenticated.

In particular embodiments, where two factor authentication is deployed, authentication module 86 may include a token server 88b. One example token server is that developed and offered by RSA Security. Typically, a user of client 50c is in possession of a piece of hardware that is commonly referred to as a "token." Alternatively, client 50c may include authentication software that is referred to as a "soft token." The token or soft token generates an authentication code that may be used within a given time interval as identification information for the subject. For example, authentication codes generated by the token or soft token may be usable for 30 or 60-second increments. If the user is not authenticated within the given time interval, the token or soft token must be used to generate a subsequent authentication code that has a similar lifespan.

Thus, a user authenticating to sub-network 42 by way of a dial-in server or through a firewall may be required to enter both a personal identification number and the authentication code generated by the token hardware. When the authentication code is received by token server 88b, token server 88b computes an authentication code that is valid for the token during the given time interval. If the authentication code provided by the subject is the same as the authentication code that is valid at that moment in time for that particular token, token server 88b makes the decision to allow access. Conversely, if the authentication code provided by the subject is different from the authentication code generated by token server 88b, token server 88b makes a decision to deny access.

In particular embodiments, systems monitor 92a may include a TRIPWIRE® server as provided by Sun Microsystems, Incorporated. The Tripwire server may identify devices on the server using two possible methods: agent nodes and agentless nodes. Agent nodes use a software agent to perform actions locally on the sub-network 42 device. Agent nodes then send the data back to systems monitor 92a. Primary benefits provided by agent nodes are the monitoring of metadata and local processing of monitoring activities.

In operation, when a user or client 50 subscribes to a service offered by sub-network 42, user credentials such as the identification information discussed above are stored. For example, user identification codes and passwords or passcodes may be stored for the user or client 50. Additionally, other information relating to group information or other attributes may be stored. When credential information is received from a user seeking access to sub-network 42 and offered services, the information may be forwarded to authentication module 86 and to radius server 88a, specifically. Radius server 88a and token server 88b may cooperate with directory services server 88c to perform authentication of the user.

Integrity Management

Integrity management includes the monitoring of all sub-network 42 devices for possible malicious changes. For the performance of such services trusted network 68b includes integrity manager 90. In particular embodiments integrity manager 90 may include two components: a systems monitor 92a and a logging server 92b. The systems monitor 92a may monitor all components of sub-network 42 for changes to system status, configuration settings, file content, or file metadata. Systems monitor 92a may identify changes caused by individual network users of clients 50 or other applications such as software-provisioning and patch-management tools. Systems monitor 92a may provide report generation for change activity and ensure compliance with audit requirements. Systems monitor 92a may also include search and report features and change history reporting capabilities.

In particular embodiments, systems monitor 92a may include a TRIPWIRE® server as provided by Sun Microsystems, Incorporated. The Tripwire server may identify devices on the server using two possible methods: agent nodes and agentless nodes. Agent nodes uses a software agent to perform actions locally on the sub-network 42 device. Agent nodes then send the data back to systems monitor 92a. Primary benefits provided by agent nodes is the monitoring of metadata and local processing of monitoring activities.

A systems monitor 92a such as a Tripwire server may also use agentless nodes. Agentless nodes are defined on systems monitor 92a by node properties, communication protocol and login credentials. Agentless nodes allow node restoration capabilities and command output generation and capture. Devices that may be monitored by agentless nodes include routers, switches, firewalls, load balancers, and UNIX systems.

Integrity management may also include logging services provided by logging server 92b, in particular embodiments. Logging server 92b operates to provide computer system management and security auditing. For example, logging server 92b may collect event log data from all network devices and other infrastructure elements included in sub-network 42. The collection of records by logging server 92b may be on a daily basis or at some other appropriate time interval. Log data may be archived such that such information is available for long term audit requests.

Where sub-network 42 is PCI compliant, logging server 92b may collect event log data from all devices that are PCI compliant. In particular embodiments, logging server 92b may operate using syslog protocol. Thus, logging server 92b may include a syslog server for receiving messages sent by UDP or TCP. The configuration on all switches, routers, servers, other sub-network devices with syslog capabilities may be modified to send the event data to logging server 92b.

In particular embodiments, logging server 92b or another server associated with logging server 92b may be configured for isolated mode access. Such a server may allow the transfer of event log data from managed firewall services and IDS services. The transferred log data may also be processed and stored for audit requests. Where desirable, logging server 92b or another server associated with logging server 92b may include a script for processing log data to create a daily summary report of potential errors and failed login attempts to users of clients 50. Where utilized, the summary report may be reviewed by security personnel for the identification of security problems.

Network Intrusion Detection Sensors (NIDS) and Host-Based Intrusion Detection Sensors (HIDS) are deployed in strategic locations within the PCI infrastructure to identify possible security incidents. The NIDS and HIDS may operate to detect malicious and/or unauthorized activity within a network or device. Configuration data, metadata, and log files are sent to logging server 92b for integrity management purposes. Such information prevents the NIDS and/or HIDS within the PCI infrastructure from being maliciously reconfigured so that the sensors do not properly identify malicious or unauthorized activity as intended. Thus, in addition to using NIDS and HIDS to monitor the malicious and unauthorized activity on devices within the PCI infrastructure, the configuration of the sensors is also monitored. In this manner, the PCI infrastructure operates to check the checker.

Figure 4:
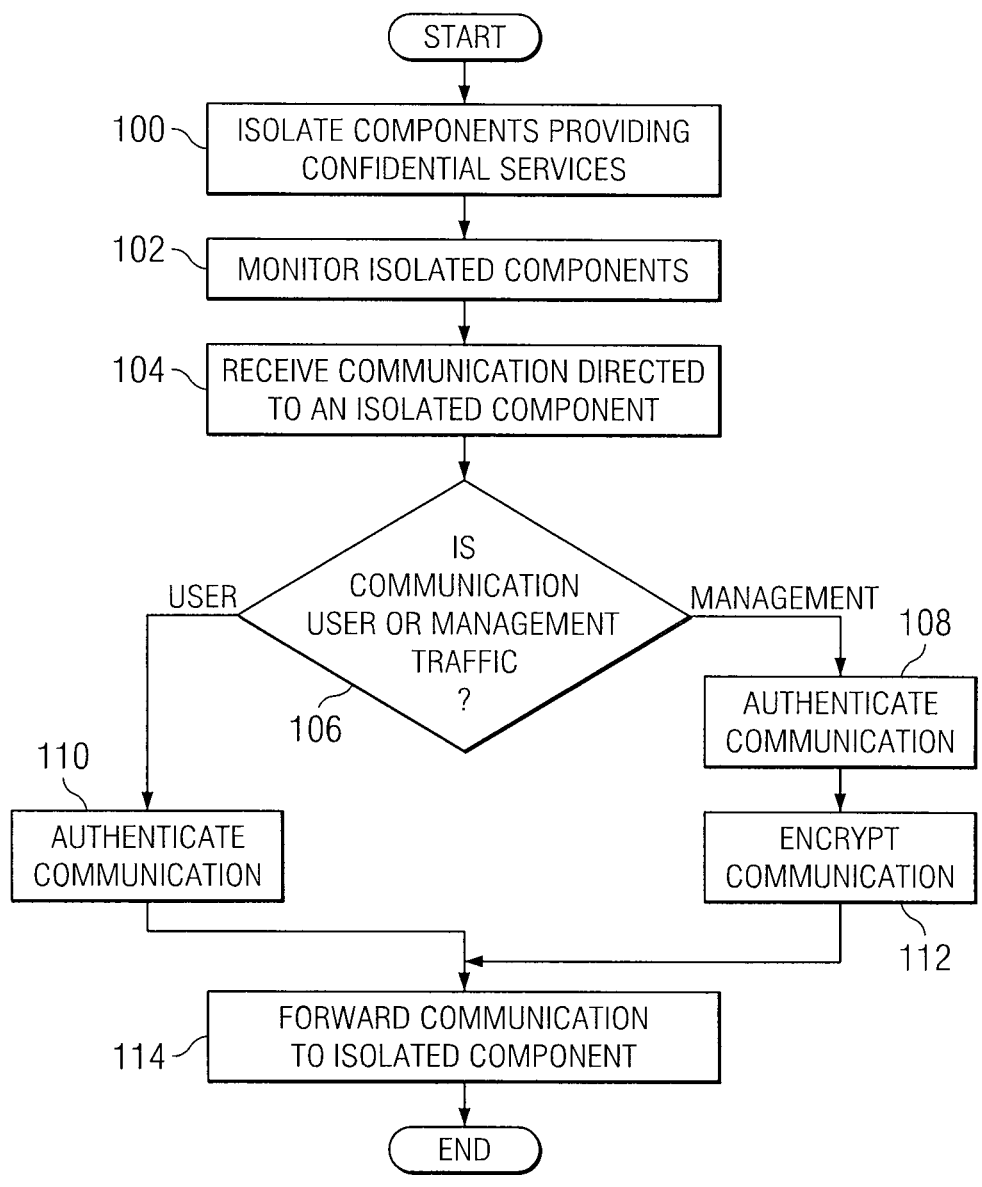
FIG. 4 illustrates a flow chart describing an example method for safeguarding and processing confidential information in accordance with the present invention.

FIG. 4 illustrates a flow chart describing an example method for providing restricted access to confidential services without impacting the security of a network in accordance with the present invention. The method described herein may be carried out using computer software, as can any or all of the processes described herein. That software may be executed by computer 10, gateway 48, or any other computer or combination of computers.

At step 100, a gateway 48 is provided to isolate one or more components providing confidential services from one or more other portions of an enterprise network. In a particular embodiment, a sub-network is established within the enterprise network for housing one or more system components providing the confidential services. Gateway 48 may separate the sub-network from other components of the enterprise network. In particular embodiments, the providing of confidential services may include the processing of credit or other confidential information. Additionally or alternatively, the providing of confidential services may include storing credit or other confidential information. As one example, the credit or other confidential information may include Payment Card Industry data.

At step 102, various devices and components providing confidential services may be monitored for the identification of any malicious changes. Monitoring the devices and components may include monitoring one or more servers associated with the processing of confidential information to identify or unauthorized system changes. For example, log event data from the one or more servers may be collected for the identification of malicious or unauthorized activity.

At step 104, a first communication may be received at the gateway. The first communication may be directed to a selected one of the one or more components isolated within the sub-network from other components of the enterprise network. In a particular embodiment, the first communication may be received from a client system that is associated with the enterprise network. Alternatively, the first communication may be received from a client system that is not associated with the enterprise network.

At step 106, it is determined whether the first communication is management traffic or user traffic. User traffic may include any communication seeking access to a component providing confidential services. In contrast, management traffic may include any communication that seeks to perform administrative functions with respect to one or more components providing confidential services. If the first communication is management traffic, the first communication is authenticated at step 108. Conversely, if the first communication is user traffic, the first communication is authenticated at step 110. The type of authentication used may vary depending upon the source of the first communication. For example, where the communication is received from a client that is associated with the enterprise network, the first communication may be authenticated using single-factor authentication. Where the communication is received from a client that is not associated with the enterprise network, however, the first communication may be authenticated using two-factor authentication. Two factor authentication may include authenticating the first communication based on at least two pieces of information. Examples of types of information that may be used for authentication include a user name, a password, a pass phrase, an identification number, an address, an account number, a digital signature, an anatomical attribute, a cryptographic key, and/or a token.

Where the first communication was determined to be management traffic at step 106, the authenticated first communication traffic may be encrypted at step 112. In particular embodiments, if the first communication is not supported by a provided encryption module, a hosting server may be used for hosting and encrypting the unsupported communication.

Upon being encrypted the management traffic may be forwarded to the appropriate isolated component providing confidential services at step 114.

Where the first communication is determined to be user traffic at step 106, however, the first communication may be forwarded to the appropriate component providing the confidential services at step 114. Thus, in a particular embodiment, a first communication that is determined to be user traffic may be forwarded to the appropriate component in an unencrypted format.

As described above, the described system and method relies on two different network paths for management/administration traffic and production/user traffic. Because only management traffic to PCI-compliant devices and not user traffic undergoes the rigorous security implementations described above, the user experience remains unchanged even when the user utilizes a PCI application. Accordingly, the described system architecture and method minimizes the impact to the user. Only the traffic which accesses PCI-compliant servers to store, process, manipulate, or review cardholder data as part of an application, are considered management and/or administration traffic and, thus, are directed to the network path for management/administration traffic.

Although the present invention has been described in detail, it should be understood that various changes, substitutions and alterations can be made hereto without departing from the sphere and scope of the invention as defined by the appended claims. For example, the steps described with regard to FIG. 4 are merely provided as example methods for performing the functionality described. It is recognized that the methods may be performed using any combination of the steps described together with any other appropriate steps safeguarding confidential information. Furthermore, it is recognized that the steps may be performed in any order without departing from the intended scope of the invention.

Additionally, the embodiments illustrated in FIGS. 1, 2, and 3 merely represent example configurations for the components of system 10. It is recognized that many modifications to these systems may be made without departing from the intended scope of the invention. For example, as another possible modification to the described system, it is recognized that first firewall 78 does not need to be physically located next to or in immediate proximity to second firewall 80. In fact, first firewall 78 and first trusted zone 68a may be physically located in another sub-network within the enterprise or private network. Thus, first firewall 78 and first trusted zone 68a may be located in one sub-network of the enterprise, and second firewall 80 and second trusted zone 68b may be located in another enterprise network. Such an embodiment may be considered a PCI Satellite. For the communication of traffic between first trusted zone 68a and second trusted zone 68b in a PCI satellite embodiment, an encrypted tunnel must be established between the two trusted zones so that all traffic between the two trusted zones is encrypted.

To aid the Patent Office, and any readers of any patent issued on this application in interpreting the claims appended hereto, applicants wish to note that they do not intend any of the appended claims to invoke ¶ 6 of 35 U.S.C. §112 as it exists on the date of filing hereof unless "means for" or "step for" are used in the particular claim.

What is claimed is:

1. A method for providing restricted access to confidential services without impacting the security of an enterprise network, comprising:

using a gateway to isolate one or more components providing confidential services from one or more other portions of an enterprise network;

receiving, at the gateway, a first communication directed to a selected one of the one or more components;

determining if the first communication is user traffic or management traffic, wherein user traffic contains confidential information and wherein management traffic comprises a communication to perform administrative functions with respect to a component providing confidential services;

authenticating the first communication and implementing Payment Card Industry (PCI) security control separately between the user and management traffic, wherein only the management traffic undergoes more rigorous security measures than the user traffic does;

if the first communication is user traffic, forwarding the first communication to one of the one or more components, which are PCI compliant devices in a first trusted zone for data processing; and if the first communication is management traffic, encrypting the first communication and forwarding the communication to one of the one or more components, which are PCI compliant devices in a second trusted zone for accessing and managing the devices in the first trusted zone; and monitoring the one or more components of the enterprise network to identify malicious changes.

2. The method of claim 1, wherein providing confidential services comprises processing credit information.

3. The method of claim 1, wherein providing confidential services comprises storing credit information.

4. The method of claim 2 or 3, wherein the confidential services comprise the processing of Payment Card Industry data.

5. The method of claim 1, further comprising establishing a sub-network within the enterprise network, the sub-network housing the one or more system components providing confidential services.

6. The method of claim 1, wherein the first communication is received from a client that is associated with the enterprise network, and wherein authenticating the communication comprises performing single-factor authentication.

7. The method of claim 6, further comprising:

establishing a sub-network within the enterprise network, the sub-network housing the one or more system components providing confidential services, and transmitting a communication originating within and remaining in the sub-network without encryption.

8. The method of claim 1, wherein the first communication is received from a client that is not associated with the enterprise network, and wherein authenticating the communication comprises performing two-factor authentication.

9. The method of claim 8, wherein performing two-factor authentication comprises authenticating at least two of pieces information selected from the group consisting of a user name, a password, a pass phrase, an identification number, an address, an account number, digital signature, an anatomical attribute, a cryptographic key, and a token.

10. The method of claim 1, wherein determining that the first communication is user traffic comprises determining that the first communication seeks access to a component providing confidential services.

11. The method of claim 1, wherein determining that the first communication is management traffic comprises determining that the first communication seeks to perform administrative functions with respect to one or more components providing the confidential services.

12. The method of claim 1, further comprising determining that the first communication is not supported by an encryption module, and wherein encrypting the first communication comprises using a hosting server for hosting the unsupported communication.

13. The method of claim 1, wherein monitoring components of the enterprise network to identify malicious changes comprises monitoring one or more servers associated with the processing of confidential information to identify malicious system changes.

14. The method of claim 1, wherein monitoring components of the enterprise network to identify malicious changes comprises collecting event log data from one or more servers associated with the processing of confidential information.

15. The method of claim 1, wherein the first communication is a communication addressed to the Payment Card Industry (PCI) compliant component.

16. The method of claim 1, wherein the one or more components to which the first communication is forwarded if the first communication is user traffic are payment card industry control standard compliant devices in the first trusted zone used for data processing and wherein the one of more components to which the first communication is forwarded if the first communication is management traffic are Payment Card Industry (PCI) control standard compliant devices in the second zone used for accessing and managing the devices in the first trusted zone.

17. The method of claim 16 further comprising implementing Payment Card Industry (PCI) security controls based upon the determination of whether the first communication is user traffic or management traffic, wherein the Payment Card Industry (PCI) security controls are only implemented upon management traffic.

18. A system for providing restricted access to confidential services without impacting the security of a network, comprising:
   an enterprise network allowing client access to one or more components providing confidential services;
   a gateway that isolates the one or more components providing confidential services from one or more other portions of the enterprise network, in which the gateway further:
   receives a first communication directed to a selected one of the one or more components providing confidential services;
   determines if the first communication is user traffic or management traffic~wherein user traffic contains confidential information and wherein management traffic comprises a communication to perform administrative functions with respect to a component providing confidential services;
   authenticates the first communication and implementing Payment Card Industry (PCI) security control separately between the user and management traffic, wherein only the management traffic undergoes more rigorous security measures than the user traffic does;
   if the first communication is user traffic, forwards the first communication to the selected one of the components, which are PCI compliant devices in a first trusted zone for data processing; and
   if the first communication is management traffic, encrypts the first communication and forwards the communication to the selected one of the components, which are PCI compliant devices in a second trusted zone for accessing and managing the devices in the first trusted zone;
   an authentication manager that authenticates the first communication; and
   an integrity manager that monitors the one or more components providing confidential services to identify malicious changes.

19. The system of claim 18, wherein the one or more components providing confidential services is operable to process credit information.

20. The system of claim 18, wherein the one or more components providing confidential services is operable to store credit information.

21. The system of claim 18, wherein the one or more components providing the confidential services is operable to process Payment Card Industry data.

22. The system of claim 18, wherein the first communication is received from a client that is associated with the enterprise network, and wherein the authentication manager is operable to perform single-factor authentication.

23. The system of claim 18, wherein the first communication is received from a client that is not associated with the enterprise network, and wherein the authentication manager is operable to perform two-factor authentication.

24. The system of claim 23, wherein the authentication manager is operable to authenticate at least two of pieces information selected from the group consisting of a user name, a password, a pass phrase, an identification number, an address, an account number, digital signature, an anatomical attribute, a cryptographic key, and a token.

25. The system of claim 18, wherein user traffic comprises a communication seeking access to a component providing confidential services.

26. The system of claim 18, wherein management traffic comprises a communication seeking to perform administrative functions with respect to one or more components providing confidential services.

27. The system of claim 18, wherein the gateway is operable to transmit a second communication originating within and remaining in the sub-network without encryption.

28. The system of claim 18, further comprising a hosting server for hosting a communication not supported by an encryption module.

29. The system of claim 18, wherein the integrity manager is operable to monitor one or more servers associated with the processing of confidential information to identify malicious system changes.

30. The system of claim 18, wherein the integrity manager is operable to collect event log data from one or more servers associated with the processing of confidential information to identify malicious system changes.

31. A computer program product embodied in a non-transitory computer readable storage medium having computer usable program code stored therewith, the computer usable program code for providing restricted access to confidential services without impacting the security of an enterprise network, the computer program product comprising:
   computer usable program code configured to isolate, using a gateway, one or more components providing confidential services from one or more other portions of the enterprise network;
   computer usable program code configured to receive, at the gateway, a first communication directed to a selected one of the one or more components;
   computer usable program code configured to determine if the first communication is user traffic or management traffic, wherein user traffic contains confidential information and wherein management traffic comprises a communication to perform administrative functions with respect to a component providing confidential services;

computer usable program code configured to authenticate the first communication and implement Payment Card Industry (PCI) security control separately between the user and management traffic, wherein only the management traffic undergoes more rigorous security measures than the user traffic does;

computer usable program code configured to forward the first communication to one of the one or more components, which are PCI compliant devices in a first trusted zone for data processing, if the first communication is user traffic;

computer usable program code configured to encrypt the first communication and forward the communication to one of the one or more components, which are PCI compliant devices in a second trusted zone for accessing and managing the devices in the first trusted zone, if the first communication is management traffic; and computer usable program code configured to monitor the one or more components of the enterprise network to identify malicious changes.

32. The computer program product of claim 31, wherein providing confidential services comprises processing credit information.

33. The computer program product of claim 31, wherein providing confidential services comprises storing credit information.

34. The computer program product of claim 31, wherein providing confidential services comprises the processing of Payment Card Industry data.

35. The computer program product of claim 31, further comprising computer usable program code configured to establish a sub-network within the enterprise network, the sub-network housing the one or more system components providing confidential services.

36. The computer program product of claim 31, further comprising computer usable program code configured to receive the first communication from a client that is associated with the enterprise network, and computer usable program code configured to perform single-factor authentication when authenticating the communication.

37. The computer program product of claim 31, further comprising computer usable program code configured to receive the first communication from a client that is not associated with the enterprise network, and computer usable program code configured to perform two-factor authentication when authenticating the communication.

38. The computer program product of claim 37, further comprising computer usable program code configured to authenticate at least two of pieces information selected from the group consisting of a user name, a password, a pass phrase, an identification number, an address, an account number, digital signature, an anatomical attribute, a cryptographic key, and a token when performing two-factor authentication.

39. The computer program product of claim 31, further comprising computer usable program code configured to determine that the first communication seeks access to a component providing confidential services when determining that the first communication is user traffic.

40. The computer program product of claim 31, further comprising computer usable program code configured to determine that the first communication seeks to perform administrative functions with respect to one or more components providing confidential services when determining that the first communication is management traffic.

41. The computer program product of claim 40, further comprising computer usable program code configured to establish a sub-network within the enterprise network, the sub-network housing the one or more system components providing confidential services, and computer usable program code configured to transmit a communication originating within and remaining in the sub-network without encryption.

42. The computer program product of claim 31, further comprising computer usable program code configured to determine that the first communication is not supported by an encryption module, and computer usable program code configured to use a hosting server for hosting the unsupported communication when encrypting the first communication.

43. The computer program product of claim 31, further comprising computer usable program code configured to monitor one or more servers associated with the processing of confidential information to identify malicious system changes when monitoring the one or more components of the enterprise network to identify malicious changes.

44. The computer program product of claim 31, further comprising computer usable program code configured to collect event log data from one or more servers associated with the processing of confidential information to identify malicious system changes when monitoring the one or more components of the enterprise network to identify malicious changes.

* * * * *

UNITED STATES PATENT AND TRADEMARK OFFICE
CERTIFICATE OF CORRECTION

| | | |
|---|---|---|
| PATENT NO. | : 9,043,589 B2 | Page 1 of 1 |
| APPLICATION NO. | : 11/940018 | |
| DATED | : May 26, 2015 | |
| INVENTOR(S) | : Robert R. Vail et al. | |

It is certified that error appears in the above-identified patent and that said Letters Patent is hereby corrected as shown below:

In the claims,

In column 13, line 46, in Claim 18, delete "traffic~wherein" and insert -- traffic, wherein --, therefor.

Signed and Sealed this

Thirteenth Day of October, 2015

Michelle K. Lee
*Director of the United States Patent and Trademark Office*